United States Patent Office 3,485,764
Patented Dec. 23, 1969

3,485,764
POLYMERIC PHOTOCHROMIC COMPOSITIONS STABILIZED WITH ULTRAVIOLET LIGHT ABSORBERS
John Kazan, Jr., Somerville, N.J., assignor to American Cyanamid Company, Stamford, Conn., a corporation of Maine
No Drawing. Continuation-in-part of application Ser. No. 369,587, May 22, 1964. This application Dec. 24, 1964, Ser. No. 421,097
Int. Cl. F21v 9/10; G02b 5/28
U.S. Cl. 252—300
3 Claims

ABSTRACT OF THE DISCLOSURE

This invention relates to the provision of photochromic compositions which comprise a polymeric material, a photochromic material prepared from a mercury salt and a diaryl thiocarbazone and an ultraviolet light absorber. The basis of the present invention is the discovery that the photochromic compounds used to impart photochromicity to the polymeric materials can be rendered extremely stable to light by conjoint use with an ultraviolet light absorber.

---

This application is a continuation-in-part of application Ser. No. 369,587, filed May 22, 1964, and now abandoned.

This invention relates to polymeric compositions capable of changing color in response to variations in the intensity of incident visible light.

More particularly, this invention relates to a method of making photochromic compositions, which comprises applying to, or incorporating in a suitable material, a combination of an ultraviolet light absorber and a mercuric complex of a diaryl thiocarbazone. It relates further to the compositions and composites resulting from this method.

Conventional dyes are substantially of constant hue and color regardless of the source or intensity of the incident visible radiation. They give the appearance of color by absorbing a portion of the incident visible radiation. If the dyed compositions are transparent, they transmit colored light. If they are non-transparent, they reflect colored light. Colored transparent materials are well-known for such common-place uses as sunglasses, lenses, goggles, windows and skylights. Colored non-transparent materials are encountered in textile, paper and coating fields. In normal light filter systems, the degree and quality of filtration are fixed when the filter is produced, and, therefore, the color is unvarying thereafter. It is not always desirable, however, to have an inflexible filter since, for many applications, the intensity of incident light goes through periodic variation. In such cases, it may be desirable to have a filter which could vary in automatic response to a variation in light intensity. Non-transparent or reflective materials which would respond to light variations with automatic color and hue change would likewise be useful in obtaining unique camouflage, design and novelty effects. Photochromic materials (i.e., materials capable of changing color as a result of visible light radiation) are known which are capable of satisfying the general demands in this area.

However, such materials have quite limited light stability. After several hours of exposure, it is found that much of the photochromic materials has been decomposed by the light and the remaining material is not capable of giving as great a color change as was originally obtained. The lack of durability of present photochromic systems is the major factor for their limited acceptance in lens applications.

Prior to the present invention, very little had been accomplished toward providing photochromic materials having improved light stability, and it is in this area that the present invention resides.

It is an object of the present invention to provide compositions which develop color upon exposure to light, and have improved stability against degradation by light. Other objects will become apparent from the ensuing description.

It is known that mercuric complexes of the following formulae:

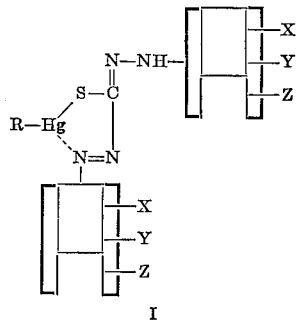

I and

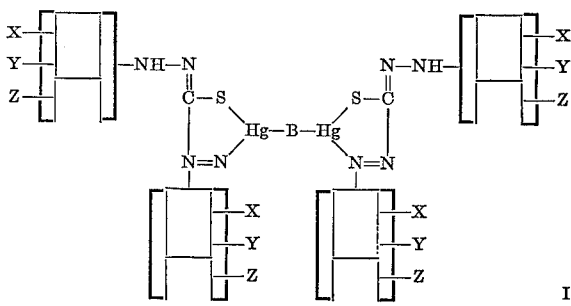

II are photochromic materials. In the formulae, X, Y and Z are intended to represent either hydrogen, a lower alkyl radical, hydroxy, a lower alkoxy radical, a halo radical, a nitro radical, an amino radical, a di-lower alkylamino radical or a phenylazo radical. The symbol R is intended to represent an alkyl radical of up to eighteen carbon atoms (including cycloalkyl of five or six carbon atoms), an alkenyl radical of 2–10 carbon atoms, an aralkyl radical, especially monocyclic ar(lower alkyl) (such as benzyl or phenethyl), an aryl radical such as phenyl, biphenylyl, naphthyl, a heterocyclic aromatic radical having five or six ring members such as furyl and pyridyl or another diaryl thiacarbazone radical:

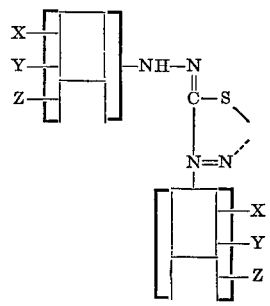

The symbol B is intended to represent a divalent organic linkage such as an alkylene radical of 2–10 carbon atoms or an arylene radical such as phenylene. The symbol ⌷ is intended to represent an aryl radical such as phenyl or naphthyl. The compounds of Formulae I and II may bear inert substituents and still be within the scope of the present invention. For example, R can be substituted by hydroxy, lower alkoxy, di-lower alkylamino, carbamoyl, halo, trifluoromethyl, nitro, carboxy, carb-lower alkoxy or lower alkanoyl. The radical B can likewise bear substituents such as those optionally found on radical R.

The present invention is based on the discovery that the combination of a compound of Formula I or Formula II with a light stabilizer of the type disclosed below leads to a composition or a composite having desirable photochromic properties and very enhanced stability. Such compositions or composites in being capable of performing their photochromic functions for a far greater period than previously known compositions, are applicable to certain end uses where long life is of prime consideration.

The ultraviolet absorbers which may be used in conjunction with the above described photochromic material are selected from the following classes of light stabilizing compounds:

(A) 2-hydroxybenzophenones:
2-hydroxy-4-methoxybenzophenone,
2,4-dihydroxybenzophenone,
2,2'-dihydroxy-4-methoxybenzophenone,
2,2',4,4'-tetrahydroxybenzophenone,
2,2'-dihydroxy-4,4'-dimethoxybenzophenone,
2-hydroxy-4-butoxybenzophenone,
2-hydroxy-4-octyloxybenzophenone,
2-hydroxy-4-dodecyloxybenzophenone,
2,2'-dihydroxy-4-octyloxybenzophenone,
4'-chloro-2-hydroxy-4-octyloxybenzophenone, etc.

(B) Benzotriazole:
2-(2-hydroxy-5-methylphenyl)benzotriazole,
2-(2-hydroxy-5-octylphenyl)benzotriazole,
2-(2-hydroxy-4-methoxyphenyl)benzotriazole, etc.

(C) Esters:
Phenyl salicylate,
tertiary-butylphenyl salicylate,
phenylresorcylate,
p-octylphenyl benzoate,
bis(p-nonylphenyl)isophthalate,
bis(p-nonylphenyl)terephthalate, etc.

(D) Triazines:
2,4,6-tris(2-hydroxy-4-octyloxyphenyl)-s-triazine,
2-(2-hydroxy-4-octyloxyphenyl)-4,6-dixylyl-s-triazine, etc.

These compounds are the subject of U.S. Patent 3,118,887, issued Jan. 21, 1964, to Hardy et al.

(E) Benzothiazoles:
2-(4-methoxyphenylimino)-3-ethylbenzothiazole,
2-phenylimino-3-ethylbenzothiazole, etc.

(F) Benzylidene-malonic esters:
Diethyl p-methoxybenzylidenemalonate,
diethyl o-methoxybenzylidenemalonate,
diethyl p-hydroxybenzylidenemalonate,
diethyl diphenylmethylenemalonate, etc.

This class of ultraviolet absorbers is disclosed in copending application of Susi, Ser. No. 362,182, filed Apr. 23, 1964, now abandoned.

(G) Arylaminoethylenes: N-methyl-p-methoxyanilinomethylenemalonitriles disclosed in U.S. Patent 3,079,366.

The amount of ultraviolet absorber should be between 0.05 and 5.0%, preferably between 0.2 and 1.0%, based on the weight of the polymeric substrate.

The amount of mercury complex which is useful for the practice of this invention depends mainly upon the desired effect and the thickness of the substrate. In general, between about 0.001% and 10.0%, preferably between about 0.005% and 5.0%, of the complex based on the weight of the substrate will be employed, but in view of the many fields of application and possible materials which can be used, special circumstances may require that more or less of the photochromic compounds be used.

The mercuric complexes of Formula I and Formula II can be prepared by several different routes. By one method, a diaryl thiocarbazone is reacted with a mercuric salt in the presence of a buffer material. This can be illustrated by the following Equation I:

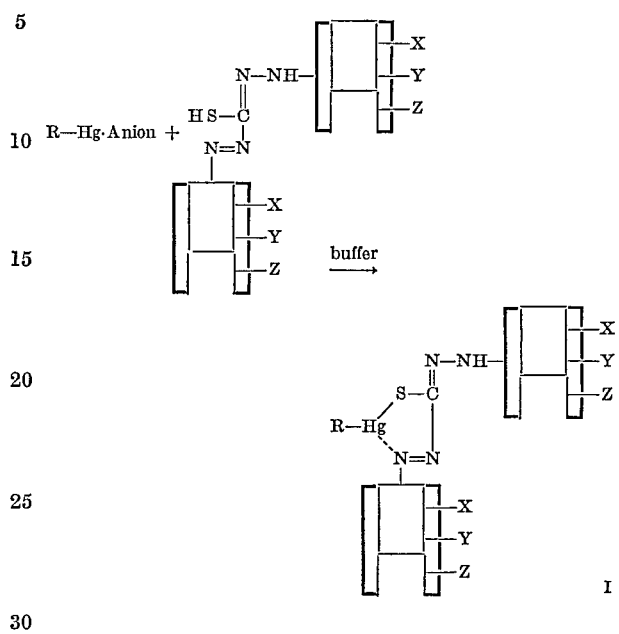

This reaction proceeds at 15° C. to 40° C. to give the product in good yield. As buffering materials, there may be used sodium carbonate, sodium bicarbonate, sodium acetate or sodium biphosphate. It is necessary to have a reaction diluent such as benzene, chloroform or methylene chloride. A two-phase solvent system is usually used in the reaction. To an equal volume mixture of one of the above solvents and water, is added the buffer, diaryl thiocarbazone and the mercury compound. The mixture is stirred for approximately a few hours at room temperature. The organic layer is separated, washed with water and a base such as ammonium hydroxide and dried. After the solvent is removed, the residue is purified by the usual procedures.

Some of these compounds can also be prepared by dissolving the mercury salt in refluxing ethanol or methanol followed by the addition of an equimolar quantity of the diaryl thiocarbazone whereupon the complex precipitates out. The compound can then be isolated by filtration and purified by the usual methods. This procedure is less time-consuming than the previous method, but it is not practical in the preparation of acid-sensitive mercury complexes since acid is formed in the reaction. This procedure can be adjusted to produce the compounds of Formula II by using two moles of the diaryl thiocarbazone with one mole of a dimercury salt with a corresponding increase in the quantity of buffer used.

The mercury bis(diaryl thiocarbazones), i.e., the compounds of Formula I wherein R is a second thiocarbazone residue, can be most easily prepared by the reaction illustrated in Equation I excepting that an inorganic mercuric salt (e.g., mercuric chloride or mercuric nitrate) is used in place of the organo mercury compound; and two moles of the diaryl thiocarbazone are used instead of one. Otherwise, reaction conditions are the same.

Suitable diaryl thiocarbazones include

N,N'-diphenylthiocarbazone (dithizone),
N,N'-bis(p-bromophenyl)thiocarbazone,
N,N'-bis(p-chlorophenyl)thiocarbazone,
N,N'-bis(o-iodophenyl)thiocarbazone,
N,N'-di-p-tolylthiocarbazone,
N,N'-di-m-tolylthiocarbazone,
N,N'-di-2,4-xylthiocarbazone,
N,N'-bis(4-bromo-2-tolyl)thiocarbazone, N,N'-bis(o-methoxyphenyl)thiocarbazone,
N,N'-bis(o-ethoxyphenyl)thiocarbazone,
N,N'-bis(3,4,5-trimethoxyphenyl)thiocarbazone,
N,N'-bis(p-phenoxyphenyl)thiocarbazone,
N,N'-bis(o-methylthiophenyl)thiocarbazone,
N,N'-bis(p-nitrophenyl)thiocarbazone,
N,N'-bis(p-aminophenyl)thiocarbazone,
N,N'-bis(p-phenylazophenyl)thiocarbazone,
N,N'-bis(p-sulfophenyl)thiocarbazone,
N,N'-di-2-biphenylylthiocarbazone,
N,N'-di-1-naphthylthiocarbazone,
N,N'-di-2-naphthylthiocarbazone.

The diaryl thiocarbazone can be prepared by the method of Hubbard and Scott, J. Am. Chem. Soc., 65, 2390 (1943).

Suitable mercuric salts for use in preparing compounds of Formulae I and II are the following:

(A) Inorganic mercuric salts such as mercuric halides, nitrate, sulfate, acetate, etc.

(B) Alkyl mercuric salts, such as methylmercuric iodide, ethylmercuric bromide, octylmercuric chloride and octadecylmercuric bromide. Other alkyl mercuric salts which have inert substituents on the organo moiety and are useful herein are 2-hydroxyethylmercuric acetate, 2 - ethoxyethylmercuric acetate, 4 - ethoxybutylmercuric iodide and pentafluoroethylmercuric iodide, etc. Cycloalkyl compounds include cyclopentylmercuric chloride, cyclohexylmercuric bromide, 2 - hydroxycyclohexylmercuric chloride, 2-ethoxycyclohexylmercuric chloride, etc. Alkenyl compounds include vinylmercuric chloride, allylmercuric bromide, etc. Aralkyl compounds include benzylmercuric acetate, etc. Carbocyclic aryl compounds include phenylmercuric acetate, p-tolylmercuric bromide, xylylmercuric acetate, 2-naphthylmercuric chloride, 2-hydroxyphenylmercuric acetate, 2,4 - dihydroxyphenylmercuric acetate, 5-hydroxy-o-tolylmercuric acetate, p-methoxyphenylmercuric chloride, 4 - fluoro - 2 - hydroxyphenylmercuric acetate, p-chlorophenylmercuric chloride, p-nitrophenylmercuric chloride, o - carbamoylphenylmercuric acetate, p-dimethylaminophenylmercuric acetate, etc. Heterocyclic aromatic compounds include 3-furylmercuric chloride, 2,5-dimethyl-3-furylmercuric chloride, 3-pyridylmercuric borate, etc.

(C) Bis-mercuric salts of the formula:

Anion·Hg-B-Hg·Anion which may be used to prepare complexes of Formula II include tetramethylenebis(mercuric chloride), pentamethylenebis(mercuric chloride), 1-methoxyethylenebis(mercuric chloride), 1 - methoxy - 4 - methyl-1,2-cyclohexylenebis(mercuric chloride), m-phenylenebis(mercuric acetate), 2,2'-biphenylenebis(mercuric chloride), 1,3-naphthylenebis(mercuric chloride), etc.

In general, it should be noted that the anionic portion of the mercuric salt is completely non-determinative of the photochromic properties of the final mercuric complex useful in the present invention. All that is required is that the mercuric salt, whatever the anion, be soluble in a reaction medium from which compounds of Formulae I and II are obtained.

When compounds of Formula I or II are applied to or incorporated in various materials, the materials are rendered photochromic. For example, polymers containing a measurable quantity of a compound of Formula I or II change color upon exposure to visible radiation (i.e., radiation having a wave length in the range of 0.4 to 0.7 micron). The color change is believed to follow from the transformation of the above compounds from a stable form (the less colored form) to a metastable form. When the source of radiation is removed, the compound returns from the metastable to the stable form.

It is not only necessary for use in the present invention that photochromic compositions be light stable and exhibit a color change, but it is also required that the color differential (relative luminosity) be sufficiently great to be visible to the eye. The time required for the color change to take place is also an important factor. The forward change (to the metastable form) and the return change, must be sufficiently rapid to reflect periodically varying light conditions. The compounds used in this invention are satisfactory in these respects as will be seen from the examples.

Either transparent or reflective substates can be used in the present invention, depending on whether a photochromic light filter or a photochromic reflective surface is desired. The photochromic compound can be combined with the substrate with which it is to be used, by conventional blending, coating, dyeing, milling or molding methods for the given substrate. The choice of application technique is not an aspect of the present invention and will depend on the nature of the substrate, available equipment, and the desired end-use for the product. Among the many materials to which the photochromic compounds can be applied are such natural polymeric materials as cotton, paper and wood. In the case of cotton and paper, a dyeing method may be used. In the case of wood, the photochromic compound may be suspended in a conventional paint or other coating vehicle, along with pigments and applied by spraying or brushing techniques.

The photochromic compounds useful according to this invention may be applied to synthetic polymeric materials which may be either solid or liquid, and either transparent, translucent or opaque. Among the many usable polymeric compositions are cellulose esters such as cellulose acetate, cellulose butyrate, cellulose nitrate, cellulose acetate butyrate, cellulose propionate, cellulose triacetate, polymeric esters of acrylic acid and methacrylic acid [e.g., poly(methyl methacrylate)], polyolefins, polystyrenes, poly(vinyl halides), poly(vinyl chloride-vinyl acetate) copolymers, polycarbonates, polyacetals, poly(vinyl butyral), poly(vinyl acetate), cellulose ethers such as cyanoethylated cellulose and carbamylethylated cellulose, melamine resins, polyacrylonitrile, polyester resins, etc.

It is noteworthy that the desirable effects of the light stabilizer upon the photochromic compound can be obtained by either mixing the stabilizer with the photochromic compound in a polymeric substrate or by coating, overlaying or superimposing the photochromic polymeric composition with a layer comprising a solid or liquid solution of the ultraviolet absorbing material. In this case, the light stabilizer is not in direct contact with the photochromic compound and is in a better position to perform its function as an ultraviolet light absorber. The ultraviolet screening substrate can be any polymeric material which is transparent or translucent such as cellulose acetate, cellulose acetate butyrate, poly(vinyl chloride), polyethylene, polypropylene, etc. The overlaid ultraviolet screen may be bonded to the photochromic material through conventional adhesion techniques or, in many cases, it can be cast onto the photochromic mixture by dipping the latter in a solution containing the ultraviolet absorber and dissolved polymer.

Along with the photochromic compounds of Formula I and Formula II, there may be added to the substrate other materials such as dyestuffs which are not themselves photochromic, to give unique color effects. For example, a blue dyestuff and a mercury complex of a diaryl thiocarbazone of the present invention give a green color mixture before exposure to light. As the photochromic mixture becomes colored (upon exposure), the color changes to gray or blue. Without the non-photochromic dye, a change in color from yellow to gray to blue would be observed. The addition of such auxiliary dyestuffs is entirely optional and does not form a necessary part of the present invention.

The following examples are presented to further illustrate the present invention. Parts are on a weight basis unless otherwise stated.

EXAMPLE 1

Methyl[(phenylazo)thioformic acid 2-phenylhydrazidato] mercury organo-mercuric salt for those used in Examples 1 and 2. A summary of the preparations and products is shown in Table I.

TABLE I

| Mercuric salt | Mercuric complex | Method of example | Melting point, ° C. |
| --- | --- | --- | --- |
| Phenylmercuric chloride | Phenyl-[(phenylazo)thioformic acid 2-phenylhydrazidato]mercury. | 1 | 178-178.5 |
| 2-hydroxyphenylmercuric chloride | (2-hydroxyphenyl)-[(phenylazo)thioformic acid 2-phenylhydrazidato]mercury. | 2 | [1] 233-234 |
| ,4-dihydroxyphenylmercuric chloride | (2,4-dihydroxyphenyl)-[(phenylazo)-thioformic acid 2-phenylhydrazidato]mercury. | 2 | [1] 237 |
| -hydroxycyclohexylmercuric acetate | (2-hydroxycyclohexyl)-[(phenylazo)-thioformic acid 2-phenylhydrazidato]mercury. | 1 | 87-89 |
| -hydroxyethylmercuric acetate | (2-hydroxyethyl)-[(phenylazo)thioformic acid 2-phenylhydrazidato]mercury. | 1 | 136.5-137-5 |

[1] Decomp.

To 550 parts of benzene and 400 parts of water, there is added with stirring 12.8 parts (0.05 mole) of dithizone, 12.6 parts (0.15 mole) of sodium carbonate and 17.3 parts (0.05 mole) of methylmercuric iodide. The orange-colored mixture is stirred for about three hours at room temperature. The aqueous layer is separated from the benzene portion and the latter is washed with water, dilute aqueous ammonium hydroxide, and again with water. The solvent is then removed by evaporation, and the residue is recrystallized from a chloroform-methanol mixture to give about 22 parts of a crystalline solid, melting at 144.5–145.5° C. This represents a yield of about 94% of theory.

The composition of 0.3 part of this solid and 0.3 part of 2-(2 - hydroxy - 5 - methylphenyl)benzotriazole in 100 parts of polyester resin shows enhanced light stability as compared with a composition lacking the benzotriazole.

EXAMPLE 2

(p-Dimethylaminophenyl)[(phenylazo)thioformic acid 2-pehnylhydrazidato]mercury

To 3.8 parts (0.01 mole) of p-dimethylaminophenylmercuric acetate in about 800 parts of ethanol at the reflux temperature, there is added with stirring 2.56 parts (0.01 mole) of dithizone. The resultant red reaction mixture is stirred and refluxed for about 15 minutes. After cooling, the orange precipitate is separated and crystallized from ethanol to give crystals amounting to about 4.5 parts (79% of theory), melting point 175–176° C.

The composition of homopolystyrene containing 0.3 part of the above mercuric complex and 0.4 part of phenylsalicylate per hundred parts of the total composition shows enhanced light stability as compared to the corresponding composition without the phenyl salicylate.

EXAMPLES 3–7

Using the procedures of Examples 1 and 2, other complexes are prepared by substituting the appropriate

EXAMPLE 8

Visible spectra of the products of Examples 1–7

The visible spectra of the initial and metastable forms of the mercuric complexes are obtained using 0.010 gram-per-liter solutions of the compounds in benzene. The measurements are made on a spectrophotometer (Cary 14 type). The spectra of the metastable forms are taken after exposure of the solutions to a strong incandescent light. The absorption peaks in the visible range, designated $\lambda_{max}$, and the absorptivities at the wavelengths of maximum absorption, designated $a_{max}$, are shown in Table II. The value for $a_{max}$ is calculated using the following relationship:

$$a_{max} = \frac{1}{bc} \log \frac{T_0}{T}$$

wherein $a$ is the absorptivity.

$b$ is the thickness of the cell (spectrophotometer) in cm.

$c$ is the concentration in grams per liter.

$T$ is the transmittance of light passing through the solution.

$T_0$ is the transmittance of light passing through the solvent in the same cell.

TABLE II

| Compound | Stable less colored form | | Meta-stable more colored form | |
| --- | --- | --- | --- | --- |
| | $\lambda_{max}$ | $a_{max}$ | $\lambda_{max}$ | $a_{max}$ |
| (2,4-dihydroxyphenyl)-[(phenylazo) thioformic acid 2-phenylhydrazidato]-mercury | 480 | 65.8 | 600 | 30.1 |
| (2-hydroxyphenyl)-[(phenylazo)thioformic acid 2-phenylhydrazidato]-mercury | 480 | 72.1 | 600 | 39.4 |
| Phenyl-[(phenylazo)thioformic acid 2-phenylhydrazidato]mercury | 475 | 55.6 | 600 | 27.2 |
| (4-dimethylaminophenyl)-[(phenylazo)-thioformic acid 2-phenylhydrazidato]-mercury | 475 | 58.5 | 600 | 26.8 |
| (2-hydroxycyclohexyl)-[(phenylazo)-thioformic acid 2-phenylhydrazidato]-mercury | 475 | 52.3 | 600 | 22.2 |
| Methyl-[(phenylazo)thioformic acid 2-phenylhydrazidato]mercury | 475 | 71.0 | 600 | 32.8 |
| (2-hydroxyethyl)-[(phenylazo)thioformic acid 2-phenylhydrazidato]mercury | 475 | 63.8 | 600 | 22.9 |

EXAMPLE 9

Formulations of cellulose acetate containing various organo-mercuric complexes and 0.4% of 2,2′-dihydroxy-4-methoxybenzophenone are pressed into chips of 60 mils thickness. The chips are exposed for successive one-minute periods to direct sunlight. After each exposure, luminosity or light transmittance readings are taken on an electronic photometer equipped with a Type E phototube and a photopic filter which modifies the sensitivity of the meter to correspond more closely with that of the human eye. The exposures to sunlight are repeated until maximum diminution of luminosity is attained. The time required for maximum reduction in luminosity is shown in Table III. The results show the relative "forward times."

TABLE III

| Compound: | Relative forward times, min. |
|---|---|
| (2-hydroxyphenyl)-[(phenylazo)thioformic acid 2-phenylhydrazidato]mercury | 2 |
| Phenyl - [(phenylazo)thioformic acid 2 - phenylhydato]mercury | 3 |
| Methyl - [(phenylazo)thioformic acid 2 - phenylhydrazidato]mercury | 1 |

EXAMPLE 10

Formulations of cellulose acetate containing 0.02% of mercuric complexes are pressed into chips of about 30 mils thickness. Spectra of the plastic chips are obtained using a spectrophotometer and a visible light source. After a five-minute exposure to the incandescent light of a tungsten lamp, the spectra are again obtained in the spectrophotometer and the time required for reversion to the original spectra is determined. The relative rates of return to the stable form are obtained by plotting change of absorbance vs. time and calculating the slope of the line through the first three or four points of the resulting curve. The relative rates of the reverse change from metastable to stable form are shown in Table IV.

TABLE IV

| Compound: | Relative rate of change from metastable to stable form |
|---|---|
| Phenyl-[(phenylazo)thioformic acid 2-phenylhydrazidato]mercury | 1 |
| (2-hydroxyphenyl)-[(phenylazo)thioformic acid 2-phenylhydrazidato]mercury | 1.39 |
| (2,4 - dihydroxyphenyl)-[(phenylazo)thioformic acid 2-phenylhydrazidato]mercury | 1.47 |
| Methyl-[(phenylazo)thioformic acid 2-phenylhydrazidato]mercury | 1.87 |

EXAMPLE 11

Relative luminosity values of the stable and metastable forms

The luminosity values of plastic chips prepared by the process of Example 9 are obtained as in Example 9. A blue shading dye (C.I. Soluble Blue 38) is also included. The value of the stable form is determined before exposure to sunlight and the value of the metastable form is determined after maximum conversion to the metastable form by exposure to sunlight. In Table V are shown the relative luminosity values for the stable (initial) and metastable (final) forms. Large differences in the luminosity of the two forms are desirable.

TABLE V

| Percent mercury complex | Percent dye | A Init./final | B Init./final | C Init./final |
|---|---|---|---|---|
| 0.01 | | 73/40 | 80/53 | 83/54 |
| 0.01 | 0.005 | | | |
| 0.01 | 0.010 | | 55/37 | |
| 0.01 | 0.015 | | | |
| 0.015 | 0.010 | | | |
| 0.02 | 0.005 | 58/33 | 61/30 | |
| 0.02 | 0.015 | | | 45/17 |
| 0.02 | 0.02 | 40/28 | 43/26 | |
| 0.03 | 0.01 | | 46/28 | 52/15 |
| 0.03 | 0.02 | | 38/16 | |

A—(2-hydroxyphenyl)-[phenylazo)thioformic acid 2-phenylhydrazidato]mercury.
B—Phenyl-[(phenylazo)thioformic acid 2-phenylhydrazidato]mercury.
C—Methyl-[(phenylazo)thioformic acid 2-phenyl hydrazidato]mercury.

EXAMPLE 12

Cellulose acetate chips (about 60 mils thickness) containing 0.01% of mercuric complex and 0.4% of 2,2'-dihydroxy-4-methoxybenzophenone are exposed to outdoor daylight. In Table VI, there are shown the percent of the compound remaining in the plastic chip after seven and thirteen hours of exposure.

TABLE VI

| Hours | Percent remaining | | | |
|---|---|---|---|---|
| | A | B | C | D |
| 7 | 84 | 72 | 75 | 87 |
| 13 | 78 | 60 | 60 | 79 |

A—(2-hydroxyphenyl)-[(p henylazothioformic acid 2-phenylhydrazidato]mercury.
B—Phenyl-[(phenylazo)thioformic acid 2-phenylhydrazidato]mercury.
C—Methyl-[(phenylazo)thioformic acid 2-phenylhydrazidato]mercury.
D—(2,4-dihydroxyphenyl)-[(phenylazo)thoiformic acid 2-phenylhydrazidato]mercury.

EXAMPLE 13

1-naphthyl[(phenylazo)thioformic acid 2-phenylhydrazidato]mercury

The procedure of Example 2 is followed substituting an equivalent amount of 1-naphthylmercuric chloride for the p-dimethylaminophenylmercuric acetate. The composition of the resulting product (0.3 part), 2,4,6-tris(2-hydroxy-4-octyloxyphenyl)-s-triazine (0.3 part) in 100 parts of poly(vinyl chloride) has enhanced light stability as compared to the corresponding composition without the triazine.

EXAMPLE 14

3-furyl[(phenylazo)thioformic acid 2-phenylhydrazidato]mercury

The procedure of Example 1 is followed substituting an equivalent amount of 3-furylmercuric chloride for the methylmercuric iodide.

The composition of 0.3 part of the above product with 0.3 part of 2-(4-methoxyphenylamino)-3-ethylbenzothiazole in 100 parts of polyethylene shows enhanced light stability as compared with the corresponding composition without the benzothiazole.

EXAMPLE 15

3-pyridyl[(phenylazo)thioformic acid 2-phenylhydrazidato]mercury

The procedure of Example 1 is followed substituting an equivalent amount of 3-pyridylmercuric chloride for the methylmercuric iodide.

The composition of 0.3 part of the above product with 0.3 part of N-methyl-p-methoxyanilinomethylenemalonitrile in 100 parts of polyvinylbutyral shows enhanced light stability as compared with the corresponding composition without the malonitrile.

EXAMPLE 16

2-carboxyphenyl[(phenylazo)thioformic acid 2-phenylhydrazidato]mercury

The procedure of Example 2 is followed substituting an equivalent amount of 2-carboxyphenylmercuric chloride for the p-dimethylaminophenylmercuric acetate.

The composition of 0.3 part of the above product with 0.3 part of 2-hydroxy-4-methoxybenzophenone in 100 parts of polyethylene adipate resin shows enhanced light stability as compared with the corresponding composition without the benzophenone.

EXAMPLE 17

4-benzoylphenyl[(phenylazo)thioformic acid 2-phenylhydrazidato]mercury

The procedure of Example 1 is followed substituting an equivalent amount of 4-benzoylphenylmercuric chloride for the methylmercuric iodide.

The composition of 0.3 part of the above product with 0.3 part of phenyl resorcylate in 100 parts of cellulose butyrate resin shows enhanced light stability as compared with the corresponding composition without the resorcylate.

EXAMPLE 18

Allyl[(phenylazo)thioformic acid 2-phenyl-hydrazidato]mercury

The procedure of Example 1 is followed substituting an equivalent amount of allylmercuric bromide for the methylmercuric iodide.

The composition of 0.3 part of the above product with 0.3 part of diethyl p-methoxybenzylidenemalonate in 100 parts of polyacrylonitrile resin shows enhanced light stability as compared with the corresponding composition without the malonate.

EXAMPLE 19

Octadecyl[(phenylazo)thioformic acid 2-phenyl-hydrazidato]mercury

The procedure of Example 1 is followed substituting an equivalent amount of octadecylmercuric bromide for the methylmercuric iodide.

The light stability of this product is enhanced when combined in the resinous composition described in Example 1.

EXAMPLE 20 m-Phenylenebis{[(phenylazo)thioformic acid 2-phenyl-hydrazidato]mercury}

The procedure of Example 2 is followed substituting 0.05 mole of m-phenylenebis(mercuric acetate) for the 0.1 mole of p-dimethylaminophenylmercuric acetate.

EXAMPLE 21

Methyl[(2-methoxyphenylazo)thioformic acid 2-(2-methoxyphenyl)hydrazidato]mercury The procedure of Example 1 is followed substituting an equivalent amount of N,N'-bis(2-methoxyphenyl)thiocarbazone for the dithizone.

EXAMPLE 22

Methyl[(4-chlorophenylazo)thioformic acid 2-(4-chlorophenyl)hydrazidato]mercury

The procedure of Example 1 is followed substituting an equivalent amount of N,N'-bis(4-chlorophenyl)thiocarbazone for the dithizone.

The N,N'-bis(4-chlorophenylthiocarbazone is prepared by the method of Hubbard and Scott, J. Am. Chem. Soc., 65, 2390 (1943), using p-chloroaniline.

EXAMPLE 23

Methyl[(4-phenylazophenylazo)thioformic acid 2-(4-phenylazophenyl)hydrazidato]mercury The procedure of Example 1 is followed substituting an equivalent amount of N,N'-bis(4-phenylazophenyl)thiocarbazone for the dithizone.

The N,N'-bis(4-phenylazophenyl)thiocarbazone is prepared by the method of Hubbard and Scott, J. Am. Chem. Soc., 65, 2390 (1943), using p-phenylazoaniline.

EXAMPLE 24

Methyl[(3,4,5-trimethoxyphenylazo)thioformic acid 2-(3,4,5-trimethoxyphenyl)hydrazidato]mercury The procedure of Example 1 is followed substituting an equivalent amount of N,N'-bis(3,4,5-trimethoxyphenyl)thiocarbazone for the dithizone.

The N,N'-bis(3,4,5-trimethoxyphenyl)thiocarbazone is prepared by the method of Hubbard and Scott, J. Am. Chem. Soc., 65, 2390 (1943), using 3,4,5-trimethoxyaniline.

EXAMPLE 25

Methyl[(4-nitrophenylazo)thioformic acid 2-(4-nitrophenyl)hydrazidato]mercury

The procedure of Example 1 is followed substituting an equivalent amount of N,N'-bis(4-nitrophenyl)thiocarbazone for the dithizone.

The N,N'-bis(4-nitrophenyl)thiocarbazone is prepared by the method of Hubbard and Scott, J. Am. Chem. Soc., 65, 2390 (1943), using p-nitroaniline.

EXAMPLE 26

Methyl[(4-aminophenylazo)thioformic acid 2-(4-aminophenyl)hydrazidato]mercury

The procedure of Example 1 is followed substituting an equivalent amount of N,N'-bis(4-aminophenyl)thiocarbazone for the dithizone.

The N,N'-bis(4-aminophenyl)thiocarbazone is prepared by a three-step procedure. 1,5-bis(p-nitrophenyl)-3-nitroformazan, prepared by the method of Hubbard and Scott, J. Am. Chem. Soc., 65, 2390 (1943), is reduced to the corresponding 3-nitro-thiocarbazide using ammonium sulfide. The 3-nitro-thiocarbazide is further reduced to the 3-amino-thiocarbazide using lithium aluminum hydride. The 3-amino-thiocarbazide is then oxidized to the desired carbazone by the procedure of Hubbard and Scott.

EXAMPLE 27

Methyl[(1-naphthylazo)thioformic acid 2-(1-naphthyl)hydrazidato)mercury

The procedure of Example 1 is followed substituting an equivalent amount of N,N'-di-1-naphthylthiocarbazone for the dithizone.

The photochromic materials of Examples 20–27 are improved with regard to light stability when formulated in a resinous composition with an ultraviolet absorber as described in Example 9.

EXAMPLE 28

Into cellulose acetate were milled 0.1% of mercury bis dithizonate and 0.2% of 2-hydroxy-4-methoxybenzophenone. The resultant mixture was molded into 20-mil sheets and exposed to sunlight. The stability of the mercury bis dithizonate was greater than a corresponding sample without the benzophenone.

EXAMPLE 29

Films of cellulose acetate containing mercury bis dithizonate and phenyl mercury dithizonate were exposed to sunlight and to a Fade-Ometer, with and without an overlaid ultraviolet screen, comprising a 12-mil film of cellulose acetate containing 0.5% of 2,2'-dihydroxy-4-methoxybenzophenone. The percent of mercury complex remaining was determined spectrophotometrically. The results are tabulated below:

MERCURY BIS DITHIZONATE

| Hours exposure | Sunlight, percent | | Fade-Ometer, percent | |
|---|---|---|---|---|
| | U.V. screen | No U.V. screen | U.V. screen | No U.V. screen |
| 5 | 77 | 68 | 99 | 88 |
| 10 | 69 | 62 | 87.5 | 68 |
| 15 | 61 | 44 | 83 | 49 |
| 20 | 50 | <10 | 79 | 36 |

PHENYL MERCURY DITHIZINATE

| | | | | |
|---|---|---|---|---|
| 5 | 77 | 64 | 96 | 87 |
| 10 | 58.5 | 23 | 90 | 6.5 |
| 15 | 50.5 | <10 | 85 | <10 |
| 20 | 40 | <10 | 80 | <10 |

It can be seen from the foregoing that the light exposure to reach a given degree of deterioration was at least twice the amount for the samples protected by the ultraviolet screen as for the unprotected samples.

EXAMPLE 30

A cellulose acetate film containing 0.1% methyl mercury dithizonate was exposed to light under an ultraviolet absorbing screen comprising cellulose acetate with 0.5% of 2,2′-dihydroxy-4-methoxybenzophenone. After five hours exposure 92% of the mercury compound remained undeteriorated. After ten hours exposure 86% remained undeteriorated. Contrasted to this, after five hours exposure, a cellulose acetate sample not protected by ultraviolet screen contained only 26% of the original mercury complex.

EXAMPLE 31

Milled and molded samples of cellulose acetate butyrate containing methyl mercury dithizonate with and without an ultraviolet absorber, 2,2′-dihydroxy-4-methoxybenzophenone, present, were exposed in a Fade-Ometer. The percent remaining data are given below:

| Hours | Fade-Ometer | |
| --- | --- | --- |
| | With U.V. absorber | Without U.V. absorber |
| 5 | | |
| 10 | 68 | 15 |
| 20 | 40 | <10 |

I claim:
1. A polymeric photochromic composition consisting essentially of a polymer selected from the group consisting of cellulose, cellulose esters, cellulose ethers polyolefins, polyacrylonitrile, polycarbonates, polyacetals, polystyrenes, poly(vinyl halides), poly(vinyl butyral), poly(vinyl acetate), melamine condensation products and polyesters; from 0.001% to 10.0%, based on the weight of the polymer, of (2-hydroxyethyl[(phenylazo)thioformic acid 2-phenylhydrazidato]mercury; and 0.05% to 5.0% by weight of the polymer, of an ultraviolet light absorber selected from the group consisting of an hydroxybenzophenone, a benzotriazole, an ester of an aromatic acid and a member of the group consisting of phenol and alkyl substituted phenol, a triazine, a benzothiazole, a benzylidene-malonic acid ester and an arylamino ethylene.

2. A polymeric photochromic composition consisting essentially of a polymer selected from the group consisting of cellulose, cellulose esters, cellulose ethers, polyolefins, polyacrylonitrile, polycarbonates, polyacetals, polystyrenes, poly(vinyl halides), poly(vinyl butyral), poly(vinyl acetate), melamine condensation products and polyesters; from 0.001% to 10.0%, based on the weight of the polymer, of a photochromic compound having a formula selected from the group consisting of:

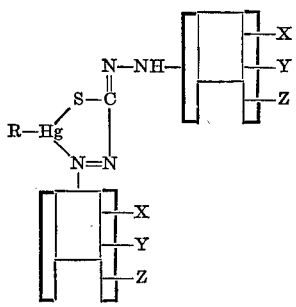

and

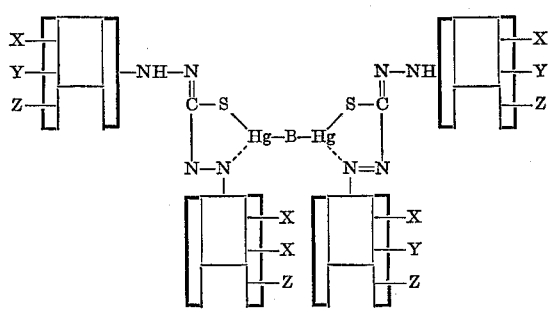

wherein R is a member selected from the group consisting of alkyl or up to eighteen carbon atoms, alkenyl of 2–10 carbon atoms, monocyclic ar(lower alkyl), aromatic of less than three rings and another diaryl thiocarbazone radical:

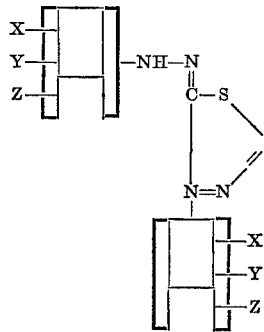

▢ is a member selected from the group consisting of phenyl and naphthyl; B is a divalent organic linkage selected from the group consisting of alkylene of 2–10 carbon atoms and phenylene; and each of the symbols, X, Y, and Z, individually represents a member selected from the group consisting of hydrogen, lower alkyl, hydroxy, lower alkoxy, halo, nitro, amino, di-lower alkylamino and phenylazo; and 0.05% to 5.0% by weight of the polymer, of 2,2′-dihydroxy-4-methoxybenzophenone.

3. A polymeric photochromic composition consisting essentially of a polymer selected from the group consisting of cellulose, cellulose esters, cellulose ethers, polyolefins, polyacrylonitrile, polycarbonates, polyacetals, polystyrenes, poly(vinyl halides), poly(vinyl butyral), poly(vinyl acetate), melamine condensation products and polyesters; from 0.001% to 10.0%, based on the weight of the polymer, of a photochromic compound having a formula selected from the group consisting of:

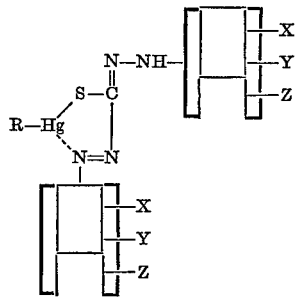

and

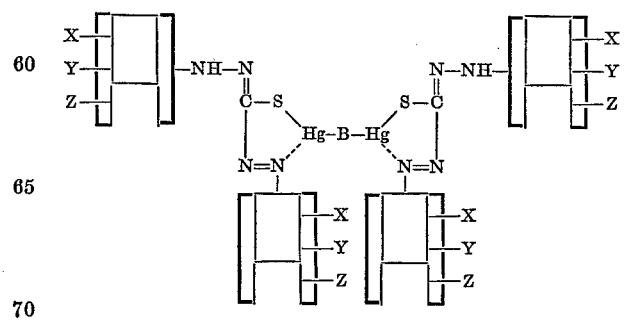

wherein R is a member selected from the group consisting of alkyl of up to eighteen carbon atoms alkenyl of 2–10 carbon atoms, monocyclic ar(lower alkyl), aromatic of less than three rings and another diaryl thiocarbazone radical:

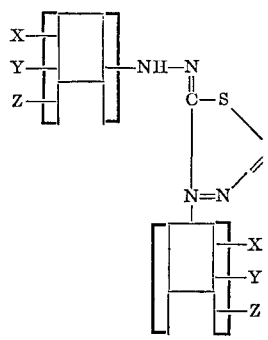

⬜ is a member selected from the group consisting of phenyl and naphthyl; B is a divalent organic linkage selected from the group consisting of alkylene of 2–10 carbon atoms and phenylene; and each of the symbols, X, Y, and Z, individually represents a member selected from the group consisting of hydrogen, lower alkyl, hydroxy, lower alkoxy, halo, nitro, amino, di-lower alkylamino and phenylazo; and 0.05% to 5.0% by weight of the polymer, of a 2,4,6-tris(2-hydroxy-4-alkoxy-phenyl)-s-triazine.

References Cited

UNITED STATES PATENTS

| | | | |
|---|---|---|---|
| 2,853,521 | 9/1958 | Hardy et al. | 252—300 X |
| 2,921,407 | 1/1960 | Wagner et al. | 88—106 |
| 3,118,887 | 1/1964 | Hardy et al. | 252—300 X |
| 3,293,037 | 12/1966 | Chopoorian | 350—160 |

FOREIGN PATENTS 649,852  10/1962  Canada.

RICHARD D. LOVERING, Primary Examiner

U.S. Cl. X.R.

96—90; 260—45.75; 350—160